Aug. 18, 1942.　　　　C. S. ASH　　　　2,293,097
DUAL WHEEL ASSEMBLY
Filed Sept. 1, 1939　　　2 Sheets-Sheet 1
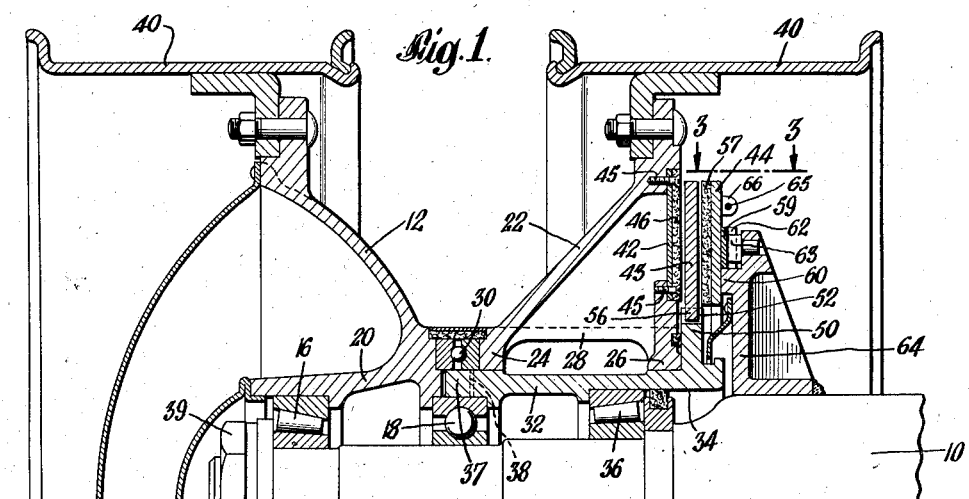
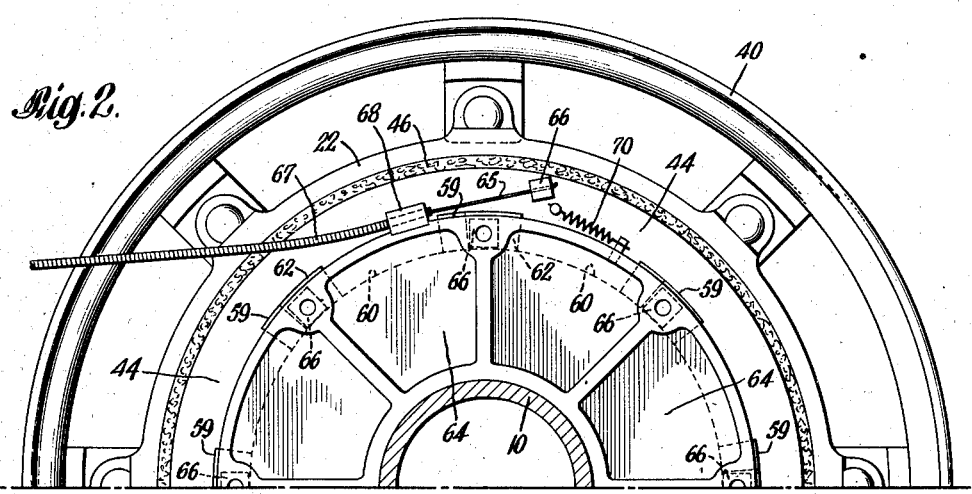
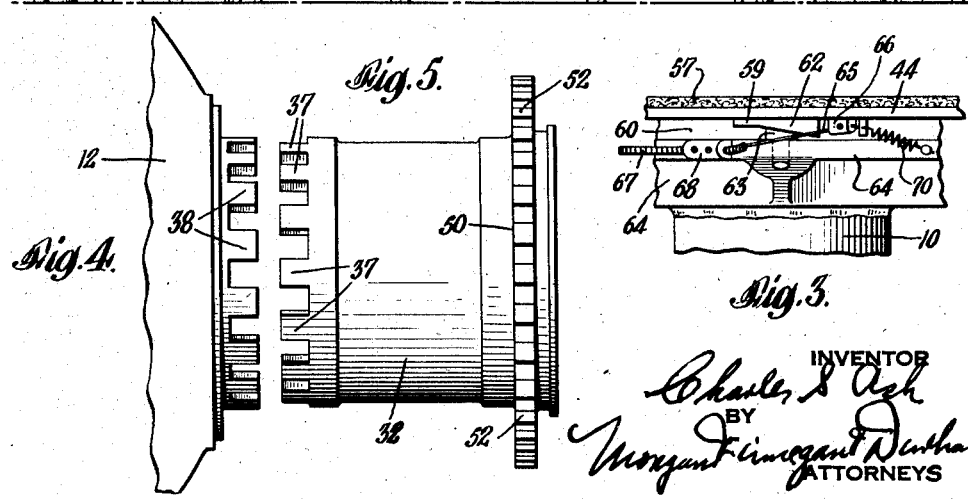
INVENTOR
Charles S. Ash
BY
Morgan Finnegan Durham
ATTORNEYS INVENTOR
Charles S. Ash
BY
Morgan Finnegan & Durham
ATTORNEYS Patented Aug. 18, 1942

2,293,097

UNITED STATES PATENT OFFICE 2,293,097

DUAL WHEEL ASSEMBLY

Charles S. Ash, Milford, Mich.

Application September 1, 1939, Serial No. 293,046

11 Claims. (Cl. 188—18)

The present invention relates to dual wheel assemblies for automotive road vehicles and more particularly to a novel and improved braking means for independently rotatable dual wheels.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 1 is a fragmentary vertical sectional view of a typical and illustrative embodiment of the invention, as applied to a dead or trailing axle;

Figure 2 is an end elevation looking from the inside of the vehicle and showing the assembly of Figure 1;

Figure 3 is a detailed fragmentary sectional view taken on the line 3—3 of Figure 1;

Figure 4 is a detailed plan view of a portion of the brake mechanism shown in Fig. 1;

Figure 5 is a detailed fragmentary plan view of a portion of the brake mechanism shown in Figure 1;

Figure 6:
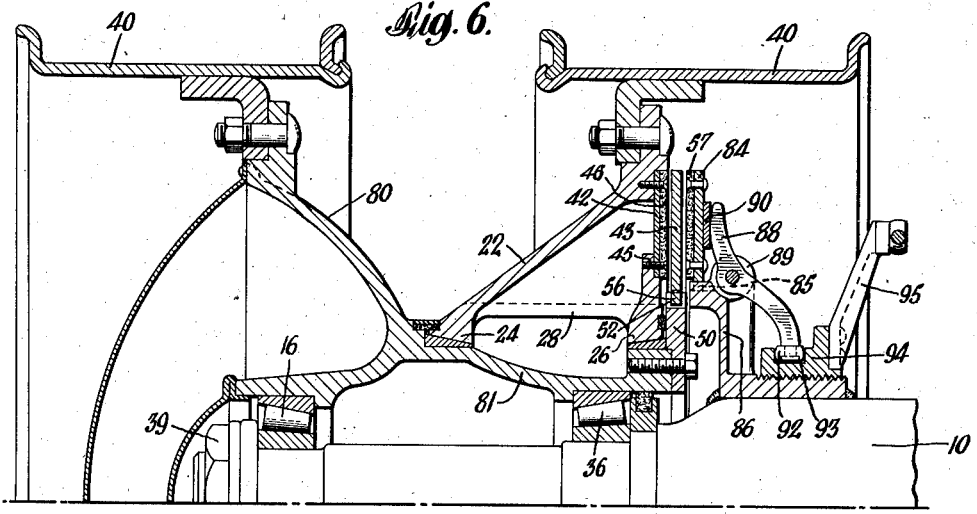
Figure 6 is a view similar to Figure 1 but showing a modification of the present invention.

The present invention has for its object the provision of a novel and improved braking means for braking the individually rotatable wheels of a dual wheel assembly. A further object of the invention is the provision of a simple, relatively inexpensive braking mechanism for independently rotatable dual wheels by which equal braking effort may be applied to each of the dual wheels. Still another object of the present invention is the provision of a compact, powerful braking means for independently rotatable dual wheels in which the braking surfaces are in the form of flat annular discs which can be easily replaced and can be readily and accurately adjusted.

In accordance with the present embodiment of the invention, showing the invention as applied to independently rotatable, non-driven wheels such as may be employed on a semi-trailer, the two wheels are mounted side-by-side for coaxial rotation about the spindle end of an axle, one of the wheels being provided with an elongated cylindrical hub portion on which the other wheel is rotatably journalled so that the two wheels may rotate independently of each other.

Attached to the inner side of the inner wheel is an annular brake disc, which is a flat circular member of considerable width, while a second braking disc of somewhat the same width is attached to the outer wheel and is mounted for free axial movement by means of a splined portion formed internally of the disc and cooperating with a similarly splined portion attached to and fast with respect to the inner end of the hub of the outer wheel, so that the disc may move axially of the outer wheel but is held against rotational movement with respect thereto.

A third disc is located inwardly of the other two discs, so that the three discs are closely adjacent each other and are in coaxial relation and this third disc is mounted for free axial movement by means of cooperating splines but is supported on and restrained or held against rotation by the axle shaft. Suitable friction material is provided between the discs and is held to some of the discs so that the proper retarding effort may be exerted between the discs as they are pressed into firm contact with each other. Means are provided for exerting this pressure to cause the braking of both wheels, and these means may be of the servo or self-energizing type, or they may be directly and fully energized by power means or by the operator of the vehicle.

In the servo type of energization, cam means are provided between a portion of the inner disc and its axle mounting so that as the inner braking disc is rotated slightly on the axle, it is moved axially into closer and firmer contact with the intermediate braking disc attached to the outer wheel hub and presses this intermediate disc into firm contact with the braking disc attached to the inner wheel. The continued rotation of the outer wheel, until the vehicle is completely stopped causes a further rotation of the innermost disc due to the friction between the intermediate and innermost discs and this further rotation causes an increase in the braking pressure so as to relieve the operator of the necessity of supplying the full energizing pressure needed.

In the non-servo type of brake, the innermost disc is held firmly against rotational movement on the axle and cam means, operated by the driver, are provided for translating the rotational movement of a brake operating part into axial movement of the two inner discs of the brake, thereby applying the brake so as to retard both of the wheels.

It will be understood that the foregoing general description and the following detailed description as well, are exemplary and explanatory of the invention but are not restrictive thereof.

Referring now in detail to the illustrative embodiment of the invention as shown by the accompanying drawings, the brake mechanism is shown as applied to an improved construction of dual wheels of the general type shown in my prior Patent No. 1,979,598. An axle end 10, such as may be used for a semi-trailer or third axle, has rotatably supported on it an outer wheel 12 by means of the outer tapered roller bearing 16 and an inner ball bearing 18 which are suitably seated in the hub portion 20 of the wheel. The inner wheel 22 is provided with a hub portion having an outer bearing ring 24 and an inner bearing ring 26 interconnected by the circumferentially spaced axially extending web portions 28. An anti-friction thrust bearing 30 is provided between the inner end of the outer wheel hub and the adjacent end of the inner wheel hub so as to permit easy relative rotation of the wheels under conditions of relatively heavy thrust.

The inner wheel is rotatably mounted for rotation about the axle end, as well as relatively to the outer wheel by means of a detachable hub extension 32 of generally cylindrical form which is provided at its outer end with a bearing seat also fitting over the outer race of ball bearing 18, and a bearing seat 34 which receives the inner tapered roller bearing 36. The hub extension 32 is provided at its outer end with relatively deep square teeth 37 which fit into and engage similar teeth 38 formed on the inwardly extending end of the outer hub 20 so as to prevent relative rotation of the hub sections, at the same time permitting their ready separation or assembly. These parts are normally held in their assembled position by means of the bearings 16 and 36 and the bearing retaining nut 39 at the end of the axle spindle.

The pneumatic tires are mounted on the wheels by means of the rims 40 which are suitably attached to the wheels in any desired manner.

The braking mechanism comprises three annular discs 42, 43 and 44. Disc 42 comprises a stiff flat steel backing plate of considerable width and supported between the larger inner portion of the wheel 22 and the bearing portion 26 in a plane normal to the axle, and is seated and held against rotation within the shoulders formed in these parts by means of the screws 45. On its inward face, the backing plate is provided with an annular ring of friction material, such as brake lining 46 which is firmly secured to the plate in any desired manner, thus providing a true running friction surface which rotates with the inner wheel and also forms a strengthening support for the outer portion of the inner wheel.

The hub extension 32, connected to the outer wheel, is formed with an externally toothed rim 50 of considerably larger diameter, extending radially close to the bearing portion 26 of the inner wheel, the teeth 52 on this rim being spur gear teeth of substantially rectangular shape. Mounted on the toothed exterior of the rim 50 is an annular disc 43 provided with interfitting teeth 56 which permit axial movement of the disc 43 but do not allow any relative rotation between the disc 43 and the rim 50. The disc 43 and the plate 42 are preferably of the same general size so that the disc 43 may make full contact with all the surface of the disc 42 to give the maximum possible friction between them. Disc 43 is made of steel or cast iron and is smooth on both sides.

For creating pressure between the discs 42 and 43 and for simultaneously applying a braking force to both of the wheels, a third disc 44 is provided inwardly of the disc 43 and is provided with a surface of brake lining or other friction material 57 on its face adjacent the disc 43. Disc 44 is rotatably mounted for limited rotation about the axle 10 by means of a plurality of lugs 59 fitted to rotate on an annulus 60 formed on the outer face of a support bracket 64 supported on and fast with respect to the axle, annulus 60 being provided with a radial face against which rests the inward side of the disc 44.

The inward face of lugs 59 is provided with a tooth 62 having an inclined face which cooperates with an inclined tooth 63 equidistant from the axle and fixed to the supporting bracket 64 at a plurality of points corresponding to those of lugs 59 so that as the disc 44 is rotated slightly, it is moved axially into contact with the disc 43 and thereby forces the disc 43 into frictional braking contact with the disc 42, the extent of the braking being dependent upon the pressure between the discs 42, 43 and 44 which in turn is dependent on the extent of rotation of the disc 43.

Means are provided for rotating the disc 44 for applying the brake and illustratively comprise the cable 65 which is fastened at one end to the disc 44 by means of the eye 66, while the cable sheath 67 is fastened to the brake anchor by means of the clamp 68. Suitable spring means are provided for reversely moving the brake disc 44 to release the brake and may comprise the spring 70 in tension between the brake disc 44 and the supporting bracket.

As the brake disc 44 is rotated to move it axially closer to the discs 43 and 42, the brake disc 44 first engages the disc 43 and continued movement forces disc 43 axially into engagement with the disc 42, thereby creating a drag or retarding force on the wheels. At the same time, the continued rotation of the disc 43, caused by the rotation of the outer wheel, tends to rotate the brake disc 44 and thereby moves the disc 44 rotationally causing a further axial movement of the disc so as to increase the braking force on both the wheels.

Figures 1 to 3 show the installation as applied to the wheels at the right side of the vehicle, and on the left side, the wheels and braking means will be duplicated, except that the cooperating inclined faces will be reversed so as to cause an increased brake application as the vehicle moves forward with the brakes applied.

Figure 7:
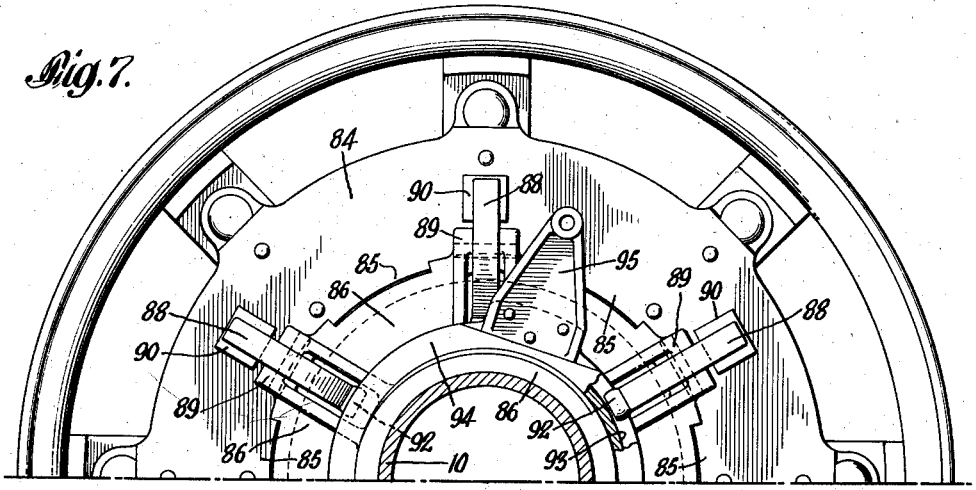
Figure 7 is an end elevation of the embodiment shown in Figure 5 and looking towards the outside of the assembly.
Figure 8:
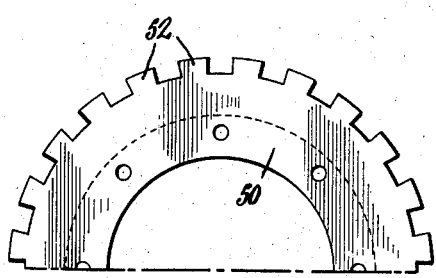
Figure 8 is a fragmentary detailed view of a portion of the braking means shown in Figures 6 and 7.

Figures 6 to 8 illustrate a modification of the invention in which the brake is of the non-servo type and as there embodied the outer wheel 80 is provided with an inwardly extending integral hub 81 to the inner face of which is bolted the intermediate splined brake disc 43 which may be moved into braking contact with the inner wheel brake disc 42 mounted on the inward face of the inner wheel. The primary brake disc 84, which creates all the braking force and causes the axial movement of the brake disc 43 into contact with the inner wheel brake disc 42 is mounted concentrically with the brake discs 42 and 43 and is held against any rotational movement by means of the splined teeth 85 on the interior of the brake disc 84 and on the exterior of the supporting bracket 86 which surrounds and is welded to the axle shaft 10.

In this modification, the brake is actuated by means of a plurality of spaced actuating fingers 88 which are pivotally mounted in brackets 89 formed integrally with the bracket 86 and have their radially outward ends bearing against a wear pad 90 secured to the inward face of the disc 84. The radially inward ends of the fingers 88 are provided with rotatable rollers 92 which fit in a circular groove 93 formed in collar 94, and collar 94 is cooperatingly threaded to fit the exteriorly threaded cylindrical extension of the supporting bracket 86. The threads between the collar 94 and the anchor 86 are preferably a multiple thread so that a relatively small angular movement of the collar 94 will produce a substantial axial movement of the collar and will cause the disc 84 to be moved axially outwardly through the action of the fingers 88. An arm 95 is rigidly fastened to the collar 94 and may be connected to a cable or to the piston of a power actuating cylinder so that the braking effort may be transmitted to the brake.

The invention in its broader aspects is not limited to the specific mechanisms shown and described but departures may be made therefrom within the scope of the accompanying claims without departing from the principles of the invention and without sacrificing its chief advantages.

What I claim is:

1. A dual wheel brake including in combination three annular discs movable into and out of contact with each other, means for holding one disc against rotational movement, means for holding the other two discs against rotational movement with respect to their respective wheels, two of said discs having free axial movement so as to press the three discs together.

2. A dual wheel brake including in combination three annular discs movable into and out of contact with each other, means for limiting the rotational movement of one disc, means for holding the other two discs against rotational movement with respect to their respective wheels, two of said discs having free axial movement so as to press the three discs together.

3. A dual wheel brake including in combination three annular discs movable into and out of contact with each other, means for holding one disc against rotational movement, means for holding the other two discs against rotational movement with respect to their respective wheels, two of said discs having free axial movement so as to press the three discs together, said axially movable discs being carried by splined members.

4. A dual wheel brake including in combination three annular discs movable into and out of contact with each other, means for holding one disc against rotational movement, means for holding the other two discs against rotational movement with respect to their respective wheels, two of said discs having free axial movement so as to press the three discs together, the intermediate disc being smooth, and friction material being secured to the adjacent faces of the other discs.

5. A pair of independently rotatable dual wheels, a member fixed to one wheel and extending through the central portion of the other wheel, a brake disc freely axially movable but held against rotation with respect to the other wheel and said member, a brake disc fixed to said one wheel and a third brake disc held against rotation and freely axially movable into contact with one of the other discs.

6. A pair of independently rotatable dual wheels, a member fixed to one wheel and extending through the central portion of the other wheel, a brake disc freely axially movable but held against rotation with respect to the other wheel and said member, a brake disc fixed to said one wheel and a third brake disc held against rotation and freely axially movable, and means for pressing the three discs together for braking the wheels.

7. A pair of independently rotatable dual wheels, a member fixed to one wheel and extending through the central portion of the other wheel, a brake disc freely axially movable but held against rotation with respect to the other wheel and said member, a brake disc fixed to said one wheel and a third brake disc held against free rotation and freely axially movable into contact with one of the other discs, and means for returning the third disc to its original position on release of the brake.

8. A pair of independently rotatable dual wheels, a member fixed to one wheel and extending through the central portion of the other wheel, a brake disc freely axially movable but held against rotation with respect to the other wheel and said member, a brake disc fixed to said one wheel and a third brake disc held against rotation and freely axially movable into contact with one of the other discs, a threaded member and means for moving the third disc by rotational movement of the threaded member.

9. A brake mechanism including a brake member to be attached to one wheel, a second brake member to be attached to a second wheel, a third brake member to be fixed to a non-rotatable part, means for rotating the third member a limited amount to cause pressure between the three brake members for braking both wheels, said third brake member engaging one of the other brake members to cause self-energization of the brake.

10. A braked dual wheel mechanism including in combination a pair of relatively rotatable dual wheels, brake means operative to apply a braking force to each of the wheels and including a member having limited rotation with one of said wheels and which is relatively movable axially with respect to both wheels, and means for relatively axially moving the brake parts to apply the brake including means for translating the limited rotation of said member into axial movement thereof for increasing the braking pressure by continued movement of the wheels.

11. A braked dual wheel assembly including in combination a pair of relatively rotatable dual wheels, a brake member attached to each wheel, a movable brake member having limited rotation with one of said wheels and relatively movable with respect to the brake members attached to said wheels and engageable with at least one of the other brake members to retard rotation of the wheels, and means actuated by the engagement of the brake members with each other, and by the continued rotation of the wheel and including means for translating limited rotational movement of said movable member with increased braking pressure between said brake members for increasing the braking effort.

CHARLES S. ASH.